United States Patent [19]
Okamoto et al.

[11] Patent Number: 5,648,035
[45] Date of Patent: Jul. 15, 1997

[54] PROCESS FOR PRODUCING FILM

[75] Inventors: Katsuya Okamoto, Hirakata; Koichi Abe, Kyoto; Shoji Nakajima, Otsu, all of Japan

[73] Assignee: Toray Industries, Inc., Tokyo, Japan

[21] Appl. No.: 482,406

[22] Filed: Jun. 7, 1995

Related U.S. Application Data

[62] Division of Ser. No. 57,642, May 5, 1993.

[51] Int. Cl.$^6$ ................................................. B29C 55/12
[52] U.S. Cl. ................. 264/173.16; 264/284; 264/290.2
[58] Field of Search ........................... 264/173.15, 210.7, 264/288.8, 173.16, 173.12, 290.2, 235.8, 173.17, 346, 284

[56] References Cited

U.S. PATENT DOCUMENTS

| | | | |
|---|---|---|---|
| 3,459,485 | 8/1969 | Rigondaud | 401/246 |
| 3,554,658 | 1/1971 | Malm et al. | 401/199 |
| 3,592,552 | 7/1971 | Malm | 401/202 |
| 3,951,905 | 4/1976 | Sano et al. | 260/40 R |
| 3,967,025 | 6/1976 | Tanabe et al. | 428/155 |
| 4,670,319 | 6/1987 | Katoh et al. | 428/141 |
| 4,677,188 | 6/1987 | Utsumi et al. | 528/272 |
| 4,759,651 | 7/1988 | Manusch et al. | 401/194 |
| 4,840,836 | 6/1989 | Eyraud | 264/173.15 |
| 4,868,006 | 9/1989 | Yorkgitis et al. | 427/531 |
| 4,990,400 | 2/1991 | Endo et al. | 428/331 |
| 5,057,364 | 10/1991 | Saito et al. | 428/323 |
| 5,069,962 | 12/1991 | Okazaki et al. | 428/323 |
| 5,085,915 | 2/1992 | Taga et al. | 428/141 |
| 5,169,583 | 12/1992 | Moriguchi et al. | 264/177.19 |
| 5,204,418 | 4/1993 | Yasue et al. | 264/176.1 |
| 5,292,471 | 3/1994 | Ito et al. | 264/210.6 |
| 5,374,467 | 12/1994 | Sato | 264/177.17 |
| 5,389,422 | 2/1995 | Okazaki et al. | 428/141 |
| 5,397,827 | 3/1995 | Kimura et al. | 264/210.7 |
| 5,441,800 | 8/1995 | Utsumi | 428/323 |

*Primary Examiner*—Jeffery R. Thurlow
*Attorney, Agent, or Firm*—Fish & Richardson P.C.

[57] ABSTRACT

Disclosed is a polyester film having a surface layer whose major component is polyester A. Protrusions are formed on the film surface originating from the crystallization of polyester A. The number of protrusions formed on the surface of the film is not less than $5\times10^3/mm^2$, and the ratio $N_R$ of the number of protrusions to the number of particles contained in a surface layer forming the surface of the film is not less than 5. Since most of or the whole of the protrusions are formed by utilizing the crystallization of polyester A without relying particles, generation of voids can be prevented and fine and uniform protrusions having excellent chipping resistance and scratch resistance can be formed.

18 Claims, No Drawings

PROCESS FOR PRODUCING FILM

This application is a division of U.S. application Ser. No. 08/057,642, filed May 5, 1993.

BACKGROUND OF THE INVENTION

1. Field of the Invention

The present invention relates to a polyester film and a process for producing the same, and more particularly to a polyester film wherein fine protrusions are formed on its surface and a process for producing the same.

2. Description of the Prior Art

Polyester films are broadly used in various uses. Better surface characteristics such as further better running ability, abrasion resistance and so forth have been required to polyester films in order to meet with the increasing speed of a film processing process, for example, a printing process in use for wrapping films, a magnetic layer applying process in use for magnetic recording media, or a thermosensible layer applying process in use for thermosensible films, or in order to meet with higher quality requirements for final products. It is known that it is effective to uniformly form fine protrusions on the surface of a film to obtain a good running ability.

With respect to formation of such fine protrusions on the surface of a film, a polyester film containing substantially spherical silica particles originating from colloidal silica is known and described in, for example, JP-A-SHO 59-171623. Further, a polyester film, wherein a thin layer containing particles to form surface protrusions is laminated on a base layer, is also known and described in, for example, JP-A-HEI 2-77431.

In the conventional polyester films such as above wherein protrusions are formed on the film surface by containing particles (for example, inert particles), however, basically there are the following problems.

The most remarkable problem on the formation of protrusions by containing particles is that, because particles contained are foreign materials relative to polyester, voids (cracks, cavities) are likely to be generated around the particles by stretching a film. Such voids cause various troubles, for example, deterioration of transparency and reduction of dielectric breakdown voltage in use for capacitors. Further, in a base film for a magnetic recording medium, chipping of the surface of the film is liable to occur because protrusions formed on the film surface become brittle. Particularly, in use for a magnetic tape, a base film has been required to be further highly oriented by a higher draw ratio in stretching from the requirement of a higher elastic modulus for the base film. Therefore, troubles such as chipping of film surface due to generation of voids has become intensified.

SUMMARY OF THE INVENTION

An object of the present invention is to provide a polyester film wherein desired fine protrusions are formed on its surface by utilizing the crystallization of polyester essentially without relying particles contained and a process for producing the polyester film, and ultimately to provide a polyester film which can prevent various troubles caused from voids and which has a surface with an excellent abrasion resistance on that fine protrusions being hardly broken are uniformly formed.

To accomplish this object and other objects, a polyester film according to the present invention comprises a biaxially oriented polyester film whose major component is polyester A, and characterized in that the number of protrusions formed on at least one surface of the film is not less than $5 \times 10^3/\text{mm}^2$, and the ratio $N_R$ of the number of protrusions to the number of particles contained in a surface layer forming the at least one surface is not less than 5.

A process for producing a polyester film according to the present invention comprises the steps of heat treating at least one surface of a non-stretched film whose major component is polyester A and accelerating the crystallization of the at least one surface by the heat treatment; and biaxially stretching the heat treated non-stretched film so that protrusions are formed on the surface of a biaxially stretched film corresponding to the at least one surface of the non-stretched film by a number of not less than $5 \times 10^3/\text{mm}^2$, and the ratio $n_R$ of the number of protrusions to the number of particles contained in a surface layer forming the surface of the biaxially stretched film is not less than 5.

In the present invention, the polyester film may be constituted as a laminated polyester film. Namely, a laminated polyester film according to the present invention comprises a layer B of a polyester film whose major component is polyester B; and a layer A of a biaxially oriented polyester film laminated on at least one surface of the layer B, the major component of the biaxially oriented polyester film being polyester A. The number of protrusions formed on the surface of the layer A is not less than $5 \times 10^3/\text{mm}^2$, and the ratio $N_R$ of the number of protrusions to the number of particles contained in a surface layer forming the surface of the layer A is not less than 5.

Further, a process for producing a laminated polyester film according to the present invention comprises the steps of laminating a layer A whose major component is polyester A on at least one surface of a layer B whose major component is polyester B to form a non-stretched laminated film; heat treating the surface of the layer A of the non-stretched laminated film and accelerating the crystallization of the surface of the layer A by the heat treatment; and biaxially stretching the heat treated non-stretched laminated film so that protrusions are formed on the surface of a biaxially stretched film corresponding to the surface of the layer A of the non-stretched laminated film by a number of not less than $5 \times 10^3/\text{mm}^2$, and the ratio $N_R$ of the number of protrusions to the number of particles contained in a surface layer forming the surface of the biaxially stretched film is not less than 5.

In the polyester film and the laminated polyester film according to the present invention, most of or the whole of the protrusions on the surface of the layer A whose major component is polyester A are formed by utilizing the crystallization of polyester A as defined by the condition that the ratio $N_R$ of the number of the protrusions to the number of particles contained in a surface layer is not less than 5. Further, the protrusions are formed by a number of not less than the specified number, i.e., not less than $5 \times 10^3/\text{mm}^2$. Because the protrusions essentially are not formed by contained particles but formed by utilizing crystallization of polyester A, voids are hardly generated. Therefore, strong and hardly broken protrusions can be formed, and various troubles caused by voids can be prevented. Further, because of formation of protrusions by utilizing crystallization of polyester A, desired, fine and uniform protrusions can be easily formed as compared with those formed by the conventional process in which particles are contained for formation of protrusions.

DETAILED DESCRIPTION OF THE PREFERRED EMBODIMENTS OF THE INVENTION

Next, the present invention will be explained in more detail by embodiments and examples. However, the present invention is not restricted by the embodiments and examples.

In the polyester film according to the present invention, the ratio $N_R$ of the number of protrusions formed on at least one surface of the film to the number of particles contained in a surface layer forming the film surface is not less than 5. The protrusions on the film surface essentially are not formed by containing particles but formed by utilizing crystallization of polyester A itself. Therefore, problems of generation of voids caused by adding particles substantially disappear, and protrusions being hardly broken can be formed. If the ratio $N_R$ is less than 5, the rate of protrusions formed by contained particles is great, and since the rate of protrusions which are easily broken by generated voids increases, a desired abrasion resistance cannot be obtained.

Thus, most of or the whole of the surface protrusions are formed by utilizing crystallization of polyester A, and the number of the protrusions is controlled to be not less than $5 \times 10^3/mm^2$. Therefore, fine protrusions being hardly broken are formed uniformly on the film surface. As a result, a polyester film having a surface with a high abrasion resistance can be obtained.

The above number of the protrusions is preferably not less than $10 \times 10^3/mm^2$. If number of the protrusions is less than $5 \times 10^3/mm^2$, a friction coefficient between films or between the film and a metal member (for example, a metal pin) increases, and the increase of friction coefficient causes reduction of handling ability and running ability.

In the polyester film according to the present invention, it is not necessary to form the whole of the protrusions as protrusions formed originating from crystallization of polyester A, as long as the above-described condition of $N_R$ is satisfied. A part of the protrusions may be formed by contained particles or non-incorporated particles (particles generated in the polyester). To obtain an excellent abrasion resistance, however, it is desired that not less than 70%, preferably not less than 85% of the protrusions existing on the film surface are formed originating from crystallization of polyester A, that is, originating from fine crystals of polyester A. Since the protrusions formed originating from fine crystals of polyester A do not accompany generation of voids, the surface of the film can be greatly improved in chipping resistance by controlling the ratio of such protrusions in the above range.

At the same time, if the surface roughness parameter Rt/Rp, that is, the ratio Rt/Rp of the surface roughness Rt to the surface roughness Rp of the surface of the film is controlled to be not less than 1.5, not only the surface is hardly chipped but also the surface can have a function to enclose therein chipped powder. Therefore, for example, when such a film is used for a magnetic tape, increase of dropout when the magnetic tape repeatedly runs in a video deck can be suppressed.

Further, in the polyester film according to the present invention, the area ratio of protrusion portions in the surface on which the above protrusions originating from crystallization of polyester A are formed is desirably controlled to not less than 5%, preferably not less than 7%, more preferably not less than 10%. By such controlling, protrusions with a uniform height can be densely formed, and a good running ability at the time of being processed or used as well as a good chipping resistance can be achieved.

Furthermore, in the polyester film according to the present invention, the ratio Rt/Ra of the surface roughness Rt (maximum height) to the surface roughness Ra (center line average height) is desirably controlled to not more than 15.0, preferably not more than 10.0. If the ratio Rt/Ra is more than the above range, the height of the protrusions becomes non-uniform and the chipping resistance of the film surface is likely to deteriorate.

Formation of the protrusions by utilizing crystallization of polyester A is performed as follows.

When a biaxially oriented polyester film whose major component is polyester A is made, at least one surface of a non-stretched film is heat treated, and thereafter, the heat treated non-stretched film is biaxially stretched. Thus, desired protrusions are formed on the surface of the biaxially oriented polyester film which corresponds to the heat treated surface at the stage of the non-stretched film.

At the stage of the non-stretched film, the crystallization of polyester A is accelerated particularly at the surface of the non-stretched film by the heat treatment, and many fine crystals are generated. This non-stretched film is biaxially stretched, the film is biaxially oriented and a required strength of the film can be obtained as well as uniform fine protrusions are formed on the film surface originating from the above fine crystals by the difference between the hardness of crystal portions and the hardness of non-crystal portions.

In the polyester film according to the present invention, the kind of polyester A is not particularly restricted. However, the crystallization parameter $\Delta Tcg$ of polyester A is preferably not more than 70° C., more preferably not more than 65° C., and further more preferably not more than 60° C. Furthermore, the solution haze of polyester A which is defined as a haze measured when polyester A is dissolved in a solvent is preferably not more than 10%.

If the crystallization parameter a $\Delta Tcg$ is more than 70° C., the surface protrusions aimed in the present invention can be hardly obtained. Even though the protrusions can be formed, the scratch resistance of the film surface is poor.

If the solution haze is more than 10%, the amount of the particles formed in the polymer and/or the content of externally added particles is too much. The surface having characteristics aimed in the present invention can be hardly obtained, and the chipping resistance of the surface is poor.

Polyester A is not particularly restricted as long as the above conditions are satisfied. However, a polyester containing at least one of ethylene terephthalate, ethylene $\alpha$, $\beta$-bis(2-chlorophenoxy)ethane-4,4'-dicarboxylate and ethylene 2,6-naphthalate as its major component is preferable as polyester A. Especially, a polyester whose major component is ethylene terephthalate is particularly preferable. With the polyester employed in the present invention, two or more kinds of polyesters may be blended and a copolymerized polymer may be used unless the objects of the present invention are deleteriously affected.

To form desired surface protrusions, the crystallization of the surface of the film whose major component is polyester A is accelerated by heat treatment before biaxially stretching as aforementioned. The mean diameter of spherulites existing in the non-stretched film before biaxially stretching is preferably in the range of 0.03 to 0.45 µm, more preferably in the range of 0.10 to 0.30 µm. By such a control, the strength of the protrusions and the scratch resistance of the surface of the biaxially stretched film are both excellent.

The polyester film according to the present invention may be used as a single-layer biaxially oriented film whose major component is polyester A, and may be used as a laminated film formed by laminating a biaxially oriented film whose major component is polyester A on at least one surface of a film whose major component is polyester B. The lamination structure is not particularly restricted. For example, the lamination structure of layer A/layer B or layer A/layer B/layer A can be employed. Further, another layer C may be employed. For example, A/B/C, A/B/C/A, A/C/B/A or A/B/C/B/A can be employed. Furthermore, layer B itself may be constituted as a laminated film.

In the formation of such a laminated film, the thickness of a layer A is preferably not more than 3 µm, more preferably not more than 1 µm to form protrusions with a uniform height and achieve an excellent abrasion resistance.

The kind of polyester B is not particularly restricted. Although polyester B preferably does not contain particles, particles may be contained.

In the polyester film according to the present invention, the total haze of the film is preferably less than 15%, more preferably less than 10%, in both cases where the film is formed as a single layer film and where the film is formed as a laminated film as described above. If the total haze is not less than 15%, the surface irregularity of the film causing such a large haze is too large. Therefore, the abrasion resistance of the surface is likely to deteriorate, and an electromagnetic conversion property deteriorates in use for magnetic recording media.

Also in the case where the polyester film is formed as a laminated film, most of or the whole of the protrusions on the surface of at least one layer A composed of a biaxially oriented film are formed originating from crystallization of polyester A. Not less than 70%, preferably not less than 85% of the protrusions existing on the surface of the layer A are formed desirably originating from crystallization of polyester A. The surface roughness parameter Rt/Rp of the surface of the layer A is preferably controlled to not less than 1.5. The area ratio of protrusion portions in the surface of the layer A is desirably controlled to not less than 5%, preferably not less than 7%, more preferably not less than 10%. The ratio Rt/Ra of the surface of the layer A is desirably controlled to not more than 15.0, preferably not more than 10.0. The crystallization parameter $\Delta$ Tcg of polyester A is preferably not more than 70° C., more preferably not more than 65° C., and further more preferably not more than 60° C. Further, the solution haze of polyester A is preferably not more than 10%. Furthermore, the mean diameter of spherulites existing in a non-stretched film before biaxially stretching is preferably in the range of 0.03 to 0.45 µm, more preferably in the range of 0.10 to 0.30 µm.

Next, the process for producing a polyester film according to the present invention will be explained in more detail.

In the process according to the present invention, at least one surface of a non-stretched film is heat treated, and then the heat treated non-stretched film is biaxially stretched. Where, "non-stretched film" means a film before cooled and solidified immediately after delivered out from a die through a film slightly stretched uniaxially (up to a draw ratio of about two times). The purpose of this heat treatment is to raise the crystallinity of the surface of the non-stretched film to a desired degree of crystallization. As the method for the heat treatment, ① a method for crystallizing the surface of a film by gradually cooling a film having a high temperature immediately after extruded, ② a method for crystallizing the surface of a film by, after cooling and solidifying a film, heating the film again, ③ a method for crystallizing the surface of a film by heat treating a film slightly stretched uniaxially, can be employed.

Although the method ② is preferred to obtain a surface formation aimed in the present invention, a desired surface formation can be obtained even by the method ① or ③ by setting adequate conditions. Although the method ② is not particularly restricted, a method for heat treating under a condition where a film is positioned on a roll, a method for heat treating a film positioned between rolls using a radiation heater, or a method for heating a film using a stenter, can be employed. As the condition of the heat treatment, a condition of a temperature of 100 to 250° C. and a period of time of 0.5 to 150 seconds is preferred A more preferable condition is a temperature of 140 to 250° C. and a period of time of 1 to 50 seconds and a further preferable condition is a temperature of 155 to 240° C. and a period of time of 2 to 10 seconds to obtain a desired surface formation more efficiently in a film formation process.

As polyester A according to the present invention, preferably polyethylene terephthalate (PET) is employed. Although it is preferred that particles are not contained in the polyester A, a small amount of particles may be contained as needed. In order to obtain advantages expected in the present invention, however, the number of protrusions formed on at least one surface of the film must be not less than $5\times10^3$/ mm$^2$, and the ratio $N_R$ of the number of protrusions to the number of particles contained in a surface layer forming the at least one surface must be not less than 5. Although the particles contained are not particularly restricted, substantially spherical silica particles originating from colloidal silica, crosslinked organic particles, calcium carbonate particles, titanium dioxide particles, alumina particles or non-incorporated particles (i.e., particles formed in a polymer) can be employed.

In the polymerization of polyester A, preferably antimony trioxide as a catalyst for polymerization and an acetate as a metal compound employed as a catalyst for esterification for the purpose of decreasing $\Delta$ Tcg and enhancing the effect as a crystal nuclei agent are used. Although the acetate is not particularly restricted, a magnesium compound is preferred to achieve the objects according to the present invention. Further, as a phosphorus compound added in the polymerization of PET, a phosphate is preferred. However, the method for preparing polyester A is not particularly limited by the above method.

To increase the addition of a catalyst in order to enhance the effect of a crystal nuclei agent is not preferred, because particles formed in the polymer are generated too much and the solution haze becomes large.

The above polyester A is supplied to a known extruder, and the molten polymer is delivered out from a die having a slit in the form of a sheet. The sheet is cooled and solidified on a casting roll to form a non-stretched film. In the case of a laminated polyester film, the above polyester A and a polyester B are supplied to different extruders, respectively. Namely, the lamination of the polyester A and the polyester B is carried out by using two or three extruders and a die having a composite manifold or a feed block for two or three layers (for example, a feed block having a rectangular shaped lamination portion), a molten sheet having two or three layers is delivered out from a die, and the delivered sheet is cooled on a casting roll to form a non-stretched film.

After the non-stretched film is heat treated as described above, the film is biaxially stretched and biaxially oriented.

In the case of a laminated polyester film, at least one surface of the non-stretched film which is formed by polyester A is heat treated. Namely, in the case of a lamination structure of A/B, the surface of layer A is heat treated. In the case of a lamination structure of A/B/A, A/B/C/A, A/C/B/A or A/B/C/B/A, the surface of one layer A of the surfaces of both layers A are heat treated. In the case where both surfaces are heat treated, the respective surfaces can be controlled to be in respective desired characteristics different from each other by controlling the respective conditions of the heat treatments to conditions different from each other. For example, the surface of one layer A is controlled to satisfy the aforementioned number of protrusions and ratio $M_R$, and the surface of the other layer A is controlled to form a flatter surface by weakening the heat treatment conditions.

As the stretching process, a sequential biaxial stretching or a simultaneous biaxial stretching can be employed. Especially, a process for using a sequential biaxial stretching, wherein firstly longitudinal stretching and secondly transverse stretching are carried out and the draw ratio of the longitudinal stretching is controlled to 3.0 to 6.5 times, is effective to obtain a surface formation aimed in the present invention. Although it is difficult to determine the optimum temperature for the longitudinal stretching to a particular temperature because the optimum temperature varies depending on the kind of polyester or a thermoplastic resin, setting the temperature to 70° to 130° C. is effective to obtain a surface formation aimed in the present invention. The stretching rate in the longitudinal direction is preferably in the range of 5000 to 50000%/min.

The transverse stretching is usually conducted by using a stenter. The draw ratio of the transverse stretching is preferably controlled to 3.0 to 5.0 times. The stretching rate in the transverse direction is preferably in the range of 1000 to 20000%/min, and the temperature for the stretching is preferably in the range of 80° to 160° C. The biaxially stretched film thus formed is then heat treated.

The temperature of the heat treatment is preferably in the range of 150° to 220° C., more preferably in the range of 170° to 210° C., and the period of time of the heat treatment is preferably in the range of 0.5 to 60 seconds.

Next, methods for determining the characteristics in the present invention and estimating the effects according to the present invention will be explained.

(1) Number of protrusions on film surface:

(Number of protrusions at surface:)

The height data of the protrusions measured with a two beam and two detector type scanning electron microscope (ESM-3200; produced by Elionics Corporation) and a cross section measuring apparatus (PMS-1; produced by Elionics Corporation) by scanning the surface of the film setting the planar portion of the surface as the base (height 0) is transferred to an image processor (IBAS-2000; produced by Karlzuis Corporation), and an image of the protrusions on the film surface is reconstructed on the display of the image processor. Then, the highest value among each height of the protrusion portions of a protrusion obtained by dividing the respective protrusion portions into two portions on the image of the protrusion is defined as the height of the protrusion, and this determination is repeated on the respective protrusions. The determination is repeated 500 times changing measuring portions, the number of the protrusions is determined by measuring the number of protrusions having a height of not less than 20 nm.

The magnification of the scanning electron microscope is set in the range of 1000 to 8000 times. In some cases, the above data obtained by the SEM may be substituted by the data obtained by using a high precision light interference type three dimensional surface analyzer (TOPO-3D produced by WYKO Corporation; objective lens: 40–200 magnifications; it is effective to use a high image dissector type camera.).

Further, a method for inclining a film at an angle of 82.5 degrees in order to determine the protrusions three-dimensionally, taking a photograph of the protrusions by the electron microscope (SEM) at a magnification of 10,000 to 500,000 times and determining the number of protrusions per 1 mm² from the average value of the measurement on 500 fields may be employed.

(2) Number of particles contained in surface layer:

In the present invention, "surface layer" means a layer defined from the surface of a film through a portion positioned at a depth of 3D. Where, "3D" means a value of three times of a mean diameter D of particles contained in the film. The cross section of the film is observed by a transmission type electron microscope (TEM), the number of particles existing in the area from the surface to a portion of a depth of 3D is measured on 500 fields at a magnification of 3,000 to 100,000 times and a mean number of particles per 1 mm² is determined from the measured data.

(3) Mean diameter of particles contained in film:

Polymer is removed from the film by plasma low temperature ashing treatment to expose the particles. The condition of the ashing treatment is selected such that the particles are not damaged whereas the polymer is ashed. The exposed particles are observed by a scanning electron microscope (SEM) and the image of the particles is processed by an image analyzer. The magnification of the SEM is about 2,000 to 10,000 times, and a visual field per one determination is appropriately selected from the range of one side length of 10 to 50 µm. Changing the portions to be observed, the volume mean diameter "d" of the particles of not less than 5,000 is determined from the diameters and volume rate thereof by the following equation.

$$d = \Sigma d_i \cdot Nvi$$

Where, $d_i$ is diameter of particle, and $Nvi$ is volume rate thereof.

In a case where the particles are organic particles and the particles are greatly damaged by the plasma low temperature ashing treatment, the following method may be employed.

Using a transmission type electron microscope (TEM), the cross section of the film is observed at a magnification of 3,000 to 100,000 times. The thickness of a cut sample for the measurement of the TEM is set to 1,000 Å, not less than 500 fields are measured changing the fields, and the volume mean diameter "d" of the particles is determined from the above equation.

(4) Ratio $N_R$:

The ratio $N_R$ is defined as a ratio of the number of protrusions determined by the above item (1) to the number of particles determined by the above item (2).

(5) Determination of substances forming protrusions:

Whether protrusions formed on the surface of the film originate from fine crystals of polyester or from particles other than polyester is determined by the following method.

The portion of the film beneath a protrusion to be determined is etched in the thickness direction of the film by an appropriate solvent, and in a case where the substance causing to form the protrusion remains as an insoluble substance, the substance forming the protrusion is determined as an externally added particle or a particle generated in a polymer (I). In a case where there is no substance remaining as an insoluble substance, the substance forming the protrusion can be determined as a fine crystal of polyester (II). As the solvent, for example, a mixture solvent such as phenol/carbon tetrachloride (weight ratio: 6/4) mixture solvent is preferred. In this method, the frequency of (I) and the frequency of (II) in a field of 1 mm² are determined, and II/(I+II) is determined as the ratio of the protrusions originating from crystallization of polyester A. However, the method for determining whether the protrusion originates from crystallization of polyester A is not limited to the above method, and other appropriate methods may be employed.

(6) Crystallization parameter Δ Tcg:

The measurement is performed by using a differential scanning calorimeter (DSC, type-II; produced by Perkin Elmer Corporation). The measuring conditions of the DSC are as follows.

Ten milligrams of a sample is placed in the DSC, and after the sample is fused at 300° C. for 5 minutes, the sample is rapidly cooled in nitrogen liquid. The rapidly cooled sample is heated at a rate of 10° C./min to find the glass transition temperature Tg. The heating is continued and the cold crystallization temperature Tcc is determined as a temperature of the crystallization exothermic peak temperature from the glass state. The difference (Tcc–Tg) between the cold crystallization temperature Tcc and the glass transition temperature Tg is defined as the crystallization parameter Δ Tcg.

(7) Solution haze of polymer:

Polyester of 2 g is dissolved in phenol/carbon tetrachloride (weight ratio: 6/4) mixture solvent of 20 ml, and the solution haze is determined based on ASTM-D-1003-52.

In the determination, the length of optical path is 20 nm.

(8) Mean diameter of spherulites:

The cross section is observed by an optical or electron microscope, and the measurement is repeated until spherulites of total number of 100 can be observed. The mean value determined from the data obtained is defined as the mean diameter of spherulites.

(9) Total haze of film:

The total haze of a film is determined based on ASTM-D-1003 using a haze meter.

(10) Ratios Rt/Rp and Rt/Ra:

The surface roughness of the film is measured by a surface roughness meter (ET-10 produced by Kosaka Kenkyusyo Corporation). The measuring conditions are as follows, and the mean value of 20 measurements is defined as the surface roughness.

Radius of the tip of probe : 0.5 μm

Load of the probe : 5 mg

Measuring length : 1 mm

Cut off : 0.08 mm

Ra is determined as follows. A portion of a measurement length L is taken off from the roughness curve obtained by the measurement using the above surface roughness meter (ET-10) along the direction of the center line. The center line of the taken off portion is expressed as X axis and an axis perpendicular to the X axis is expressed as Y axis, and the Ra is determined by the following equation.

$$Ra = (1/L) \int_0^L |f(x)| dx$$

Rt is defined as the distance between the highest peak and the deepest trough in the measurement length L.

Rp is defined as the distance from the center line created by filling the peak portions and the trough portions in the roughness curve obtained to the highest point of the curve within the measurement length L.

(11) Thickness of laminated layer A:

The cross section of the film is observed by thin cut piece method (dyeing by $RuO_4$) using a transmission type electron microscope (H-600; produced by Hitachi Seisakusyo Corporation), and the thickness of laminated layer A is determined by finding the boundary in the observation. The magnification for the determination can be selected depending upon the thickness to be determined. Therefore, the magnification is not particularly restricted, but usually a magnification of 10,000 to 100,000 times is adequate.

(12) Void:

High vision image analysis is applied for the determination of voids. In the determination, image analyzer "PIAS-IV" produced by Pias Corporation is used for the high vision personal image analyzing system, and "Metaloplan" produced by Leitz Corporation is used as the optical microscope.

(A) Making preparation:

One drop of liquid paraffin is dropped on a slide glass, a film sample cut as a square with a side of 10 mm is placed thereon, and one drop of liquid paraffin is dropped again. Then, a cover glass is placed thereon such that the film sample is sandwiched between both glasses. The sample is mounted with liquid paraffin and this is prepared as a preparation.

(B) Adjustment and measuring conditions:

The object lens of the optical microscope is set to a magnification of 32 times and the sample is inspected, and then the image is input into the high vision monitor of the image analyzer. At that time, the magnification of the observation on the monitor becomes 1560 times. The image is input at a condition of black-and-white image and filtered by a green filter, and the input image is placed in a condition of binary values to convert the brightness. The brightness representing the level of concentration at that time is set to 160. Before the setting, the brightness of the optical microscope such as diaphragm is adjusted so that the mean brightness measured under a condition where the sample is not set becomes to be 154 as a blank value.

(C) Determination:

The sum of the respective picture elements of voids obtained by placing the respective images of voids in binary condition is determined, the sum is divided by the total picture elements of the measured field to obtain an area ratio of void portions, and the area ratio of void portions is defined as the void index of the film sample, as determined by the following equation. The total picture elements per one field is about 2,000,000, the area for the measurement is 0.041 $mm^2$ and the measurement is repeated ten times changing the field. The void to be measured is defined as a void having a diameter of not less than 0.28 μm when the void is determined as an equivalent circle.

Void index=[(sum of picture elements of void portions)/(total picture elements of measured field)]×100(%)

As the criteria for determining the degree of void generation, if the void index is not more than 1%, "void" is determined to be "good", and if the void index is more than 1%, "void" is determined to be "not good".

(13) Area ratio of protrusion portions:

The same high vision analysis system as the above determination of voids is employed.

(A) Making preparation:

A preparation is prepared by depositing aluminium on a film sample (thickness of deposition layer: 500–800 Å) and applying the sample to a slide glass.

(B) Adjustment and measuring conditions:

The object lens of the optical microscope is set to a magnification of 80 times and the sample is inspected, and then the image is input into the high vision monitor of the image analyzer. At that time, the magnification of the observation on the monitor becomes 3900 times. The image is input at a condition of black-and-white image and filtered by a green filter, and the input image is placed in a condition of binary values to convert the brightness. The brightness representing the level of concentration at that time is set to 175. Before the setting, the brightness of the optical microscope such as diaphragm is adjusted so that the mean brightness measured under a condition where the sample is not set becomes to be 154 as a blank value. As the mirror for the measurement, a mirror used in a object micrometer (reflection type: produced by Nikon Corporation) is employed.

(C) Determination:

The sum of the respective picture elements of protrusions obtained by placing the respective images of protrusions in binary condition is determined, the sum is divided by the total picture elements of the measured field to obtain an area ratio of protrusion portions, and the area ratio of protrusion portions is determined by the following equation. The total picture elements per one field is about 2,000,000, the area for the measurement is 0.0064 mm$^2$ and the measurement is repeated ten times changing the field. The protrusion to be measured is defined as a protrusion having a diameter of not less than 0.11 μm when the protrusion is determined as an equivalent circle.

Area ratio of protrusion portions=[(sum of picture elements of protrusion portions)/ (total picture elements of measured field)] ×100(%)

(14) Chipping resistance:

A magnetic coating solution having the following composition is coated with a gravure roll on the surface of the film so that the coated magnetic layer is magnetically oriented, and then it is dried. After calendering the film by a small test calendering machine (steel roll/nylon roll; 5 stages) at a temperature of 70° C. and a pressure of 200 kg/cm, the film is cured at 70° C. for 48 hours. The film obtained is slit to make a tape having a width of ½ inch, and the tape is incorporated into a VTR cassette to make a VTR cassette tape.

(Composition of magnetic coating solution)(All parts are by weight.)

Co-containing iron oxide (BET value: 50 m$^2$/g) : 100 parts
Ethlec A (produced by Sekisui Chemical Corporation, Vinyl chloride/vinyl acetate copolymer) : 10 parts
Nipporan 2034 (produced by Nippon Polyurethane Corporation, polyurethane elastomer) : 10 parts
Coronate L (produced by Nippon Polyurethane Corporation, Polyisocyanate) : 5 parts
Lecitin : 1 part
Methylethylketone : 75 parts
Methylisobutylketone : 75 parts
Toluene : 75 parts
Carbon black : 2 parts
Lauric acid : 1.5 parts The video tape thus incorporated into a VTR cassette of 250 m is fast fed and rewound repeatedly 100 times using a domestic video tape recorder. The amount of chipped powder adhering to a pin in the video tape recorder and a pin in the cassette which are brought into contact with the running surface of the tape and the amount of chipped powder adhering to the running surface of the tape are observed, and the chipping resistance is determined by the following criteria.

There is no chipped powder adhering. : "excellent"
There is a small amount of powder, but there is no problem in use for video tape. : "good"
There is a large amount of powder and it is impossible to use it in most of uses for video tape. : "not good"

(15) Scratch resistance:

Scratching test is performed using a continuous load type scratch resistance tester (HEIDON-18: produced by Shinto Kagaku Corporation). The depth of the scratch generated in the test is determined by a non-contact type roughness meter (TOPO-3D: produced by WYKO Corporation).

(Measuring conditions)

Needle for scratching : made from a sapphire radius of curvature of the tip: 100 μm
Load : 0–100 g/100 mm
running speed : 10 m/minute (Estimation)

The depth of the scratch is;
not more than 0.5 μm : "excellent",
more than 0.5 μm and not more than 1.5 μm : "good", and
more than 1.5 μm : "not good".

(16) Running ability (Friction coefficient μk):

The film is slitted to prepare a tape with a width of ½ inch. The tape is set in a tape running tester (SFT-700; produced by Yokohama System Kenkyusyo Corporation) and is run on the guide pin in the tester at an atmosphere of 20° C. and 60% RH. The initial friction coefficient μk is determined by the following equation.

$$\mu k = (2/\pi) \times 1n(T_2/T_1)$$

Where, $T_1$ is the entrance side tension and $T_2$ is the exit side tension. The diameter of the guide pin is 6 mm, the material of the guide pin is SUS27 (surface roughness: 0.2 S), the winding angle is 90 degrees and the running speed is 3.3 cm/second. If the friction coefficient μk obtained is not more than 0.3, the running ability is determined to be "good". If the friction coefficient μk is more than 0.3, the running ability is determined to be "not good". The value of 0.3 of the friction coefficient μk is a value for judging whether a good handling ability can be obtained or not, when the film is processed to a magnetic recording medium, a capacitor, a package, etc.

EXAMPLES AND COMPARATIVE EXAMPLES

Preferred examples will be hereinafter explained together with comparative examples. The results of these examples and comparative examples are shown in Tables 1 and 2.

EXAMPLES

Polyethylene terephthalate polymerized by a regular method (polymerization catalyst: magnesium acetate of 0.10 wt %, antimony trioxide of 0.03 wt % and dimethylphenylphosphonate of 0.35 wt % employed as a phosphorus compound are used) was prepared as polyester A (intrinsic viscosity: 0.60, melting point: 258° C., Δ Tcg: 51° C., solution haze: 0.8%).

Polyethylene terephthalate polymerized by a regular method using magnesium acetate of 0.06 wt %, antimony trioxide of 0.026 wt % and trimethylphosphate of 0.026 wt % was prepared as polyester B (intrinsic viscosity: 0.62, melting point: 259° C., Δ Tcg: 84° C.). External particles were not particularly added to polyester A and polyester B.

Examples 1–3

A single-layer film was formed using only polyester A. After pellets of polyester A were dried at a temperature of 180° C. for 3 hours, the pellets were supplied to a known extruder and molten and extruded at a temperature of 290° C. The extruded polymer was delivered out from a die in the form of a sheet, the delivered sheet was cast on a casting drum of which surface temperature was controlled at 30° C. and cooled and solidified on the drum using an electrostatic charging method to form a non-stretched film. The surface of this non-stretched film which did not come into contact with the casting drum was heat treated using a known radiation heater. The conditions of the heat treatment were as follows.

Example 1: 150° C., 20 seconds

Example 2: 180° C., 10 seconds

Example 3: 210° C., 3 seconds

The film after the heat treatment was stretched in the longitudinal direction at a temperature of 90° C. and a draw ratio of 3.4 times. Thereafter, the film was stretched, using a stenter, in the transverse direction at a temperature of 95° C., a stretching speed of 2000% and a draw ratio of 3.5 times, and heat treated at conditions of a temperature of 210° C. and a constant length for five seconds to make a biaxially oriented film having a thickness of 15 μm. In any condition of heat treatment, the surface properties of the film obtained were within the range specified in the present invention and good characteristics of the film could be obtained.

Example 4

A very small amount of inert particles were added to the above polyester A. As the inert particles, crosslinked polystyrene particles having a mean diameter of 0.45 μm were blended in a form of water slurry into the polyester A using a vent-type twin screw extruder. The concentration of the inert particles in the polyester was controlled to 0.05 wt %. Using the pellets thus prepared, a biaxially oriented film having a thickness of 15 μm was obtained in the same manner as that of Example 2 and under the same condition of the heat treatment as that of Example 2. As compared with the results of Examples 1–3, $N_R$ obtained was slightly small, the ratio of protrusions originating from crystallization of polyester A slightly decreased, but the data of these properties were within the range specified in the present invention and the characteristics of the film obtained were satisfactory.

Examples 5 and 6

Laminated films having a lamination structure of A/B/A were formed using polyester A employed in Examples 1–3 and polyester B above-described. The pellets of polyester A and polyester B were supplied to two extruders, respectively, and the respective pellets were molten at a temperature of 290° C. The respective molten polymers were laminated in a feed block for three-layer lamination. The lamination thickness of layers A was controlled by controlling the amount of delivered polymer of polyester A using a gear pump such that the thickness of one layer A at the stage of a biaxially oriented film was 1 μm. A biaxially oriented laminated film having a total thickness of 15 μm was obtained in a manner similar to that of Example 1. The conditions of the heat treatment performed in the stage of non-stretched film were as follows.

Example 5: 180° C., 10 seconds

Example 6: 210° C., 3 seconds

Example 7

A biaxially oriented laminated film having a total thickness of 15 μm was obtained in the same manner as that of Example 5 so that the thickness of one layer A was 3 μm.

Example 8

A biaxially oriented laminated film having a lamination structure of A/B/A and having a total thickness of 15 μm was obtained in the same manner as that of Example 5 so that the thickness of one layer A was 0.6 μm. In this Example, polyester A employed in Examples 1–3 and polyester B added with a small amount of inert particles (content of particles: 0.1 wt %, colloidal silica particles having a mean diameter of 0.3 μm were dispersed in ethylene glycol and it was added to polyester B in the polymerization process) were used. Since the particles added to the base layer (layer B) did not greatly affect the surface properties of layer A, satisfactory characteristics of the film could be obtained.

Example 9

A biaxially oriented laminated film having a lamination structure of A/B/A and having a total thickness of 15 μm was obtained in the same manner as that of Example 5. In this Example, polyester B employed in Examples 5–7 was used, and polyethylene terephthalate polymerized by changing the amount of magnesium acetate to 0.20 wt % and the amount of dimethylphenylphosphonate to 0.69 wt % as compared with polyester A employed in Examples 1–was prepared as polyester A (Δ Tcg: 45° C., solution haze: 1.2%).

Example 10

A biaxially oriented laminated film having a lamination structure of A/B/A and having a total thickness of 15 μm was obtained in the same manner as that of Example 5. In this Example, polyester A employed in Example 9 was used, and polyethylene terephthalate polymerized by changing the amount of magnesium acetate to 0 wt % and the amount of trimethylphosphate to 0.087 wt % was prepared as polyester B (ΔTcg: 73° C. ).

Examples 11 and 12

A biaxially oriented laminated film having a lamination structure of A/B using polyester A employed in Examples 1–3 and polyester B employed in Examples 5–7. The pellets of polyester A and polyester B were supplied to two extruders, respectively, and the respective pellets were molten at a temperature of 290° C. The respective molten polymers were laminated in a feed block for two-layer lamination. The lamination thickness of layers A was controlled by controlling the amount of delivered polymer of polyester A using a gear pump such that the thickness of one layer A at the stage of a biaxially oriented film was 0.5 μm. A biaxially oriented laminated film having a total thickness of 15 μm was obtained in a manner similar to that of Example 1. The surface to be heat treated was the surface of layer A composed of polyester A, and the conditions of the heat treatment performed in the stage of non-stretched film were as follows.

Example 11: 190° C., 7 seconds

Example 12: 210° C., 3 seconds

Example 13

A biaxially oriented laminated film having a lamination structure of A/B and having a total thickness of 15 μm was obtained in the same manner as that of Example 11, using polyester A employed in Example 4 and polyester B employed in Example 10. The thickness of one layer A at the stage of the biaxially oriented film was controlled to 1.0 μm.

Example 14

A biaxially oriented laminated film having a lamination structure of A/B and having a total thickness of 15 μm was obtained in the same manner as that of Example 11, using polyester A employed in Example 9 and polyester B employed in Example 8. The thickness of one layer A at the stage of the biaxially oriented film was controlled to 1.0 μm.

Comparative Examples 1-3

A biaxially oriented single-layer film having a total thickness of 15 μm was obtained in the same manner as that of Example 1, using polyester A employed in Example 1. However, the conditions of the heat treatment performed at the stage of non-stretched film were changed as follows.

Comparative Example 1: 150° C., 300 seconds
Comparative Example 2: 100° C., 600 seconds
Comparative Example 3: not heat treated The surface properties obtained were out of the range specified in the present invention, and the characteristics of the obtained film were poor.

Comparative Example 4

A biaxially oriented single-layer film having a total thickness of 15 μm was obtained in the same conditions of heat treatment and in the same manner as those of Example 1, using only polyester B employed in Example 5. Since the Δ Tcg was large and the crystallization by the heat treatment was insufficient, the characteristics of the obtained film were extremely poor.

Comparative Example 5

A biaxially oriented single-layer film having a total thickness of 15 μm was obtained in the same manner as that of Example 1, using pellets prepared by adding colloidal silica particles to polyester A employed in Example 1 (content of particles: 1.0 wt %). Since the rate of the protrusions originating from particles in the formed surface protrusions was large, voids were generated and the chipping resistance of the film obtained was poor.

Comparative Example 6

A biaxially oriented laminated film having a lamination structure of A/B/A and having a total thickness of 15 μm was obtained in the same conditions of heat treatment and in the same manner as those of Example 5, using polyester B employed in Example 10 as polyester A in this Comparative Example and using polyester B employed in Example 5 as polyester B in this Comparative Example. Since the a Δ Tcg of the surface layer was large and the crystallization by the heat treatment was insufficient, the number of the protrusions originating from the crystallization is small and the characteristics of the obtained film were poor.

Comparative Example 7

Polyethylene terephthalate polymerized by a regular method (polymerization catalyst: calcium acetate of 0.09 wt %, lithium acetate of 0.17 wt %, antimony trioxide of 0.045 wt % and trimethylphosphate of 0.12 wt %) was prepared as polyester A (melting point: 260° C., Δ Tcg: 58° C., solution haze: 23%). Polyester B employed in Example 5 was used. A biaxially oriented laminated film having a lamination structure of A/B/A and having a total thickness of 15 μm was obtained in the same conditions of heat treatment and in the same manner as those of Comparative Example 6. Since non-incorporated particles generated in the polymer were formed too much, the irregularity of the surface protrusions was large and the characteristics of the obtained film were poor.

TABLE 1

| | Properties of surface | | | | Properties of polymer of layer A | | Mean diameter of spherulites in | |
| --- | --- | --- | --- | --- | --- | --- | --- | --- |
| | Number of protrusions at surface (number/mm$^2$) | $N_R$ | Ratio of protrusions originating from crystallization (%) | Rt/Rp | Crystallization parameter ΔTcg (°C.) | Solution haze (%) | non-stretched film (μm) | Film haze (%) |
| Example 1 | 150 × 10$^3$ | 30 | 96 | 1.7 | 51 | 1.2 | 0.25 | 6 |
| Example 2 | 400 × 10$^3$ | 80 | 98 | 1.8 | 51 | 1.2 | 0.20 | 7 |
| Example 3 | 600 × 10$^3$ | 120 | 98 | 1.8 | 51 | 1.2 | 0.20 | 7 |
| Example 4 | 480 × 10$^3$ | 15 | 88 | 1.6 | 51 | 2.6 | 0.20 | 8 |
| Example 5 | 430 × 10$^3$ | 75 | 95 | 1.8 | 51 | 1.2 | 0.25 | 4 |
| Example 6 | 620 × 10$^3$ | 110 | 96 | 1.8 | 51 | 1.2 | 0.20 | 5 |
| Example 7 | 410 × 10$^3$ | 80 | 96 | 1.8 | 51 | 1.2 | 0.25 | 5 |
| Example 8 | 450 × 10$^3$ | 55 | 92 | 1.7 | 51 | 1.2 | 0.20 | 8 |
| Example 9 | 550 × 10$^3$ | 90 | 97 | 1.8 | 45 | 1.6 | 0.15 | 8 |
| Example 10 | 540 × 10$^3$ | 85 | 97 | 1.8 | 45 | 1.6 | 0.20 | 6 |
| Example 11 | 420 × 10$^3$ | 80 | 98 | 1.8 | 51 | 1.2 | 0.20 | 4 |
| Example 12 | 610 × 10$^3$ | 100 | 96 | 1.7 | 51 | 1.2 | 0.20 | 4 |
| Example 13 | 500 × 10$^3$ | 13 | 86 | 1.6 | 51 | 2.6 | 0.15 | 7 |
| Example 14 | 470 × 10$^3$ | 60 | 93 | 1.7 | 45 | 1.6 | 0.15 | 7 |
| Com. Ex. 1 | 4.5 × 10$^3$ | 8 | 82 | 1.6 | 51 | 1.2 | 0.60 | 8 |
| Com. Ex. 2 | 3 × 10$^3$ | 7 | 74 | 1.6 | 51 | 1.2 | 0.80 | 9 |
| Com. Ex. 3 | 1.5 × 10$^3$ | 4 | 65 | 1.5 | 51 | 1.2 | — | 8 |
| Com. Ex. 4 | 3 × 10$^3$ | 6 | 76 | 1.4 | 84 | 0.8 | 0.40 | 6 |
| Com. Ex. 5 | 250 × 10$^3$ | 3 | 57 | 1.4 | 51 | 12.4 | 0.25 | 10 |
| Com. Ex. 6 | 4.5 × 10$^3$ | 7 | 75 | 1.6 | 73 | 1.0 | 0.55 | 9 |
| Com. Ex. 7 | 200 × 10$^3$ | 4 | 67 | 1.5 | 58 | 23.0 | 0.20 | 12 |

TABLE 2

|  | Constitution of film | Thickness of layer A (μm) | Effect | | | |
|---|---|---|---|---|---|---|
|  |  |  | Void | Chipping resistance | Scratch resistance | Running ability (μk) |
| Example 1 | single layer | — | good | excellent | excellent | good |
| Example 2 | single layer | — | good | excellent | excellent | good |
| Example 3 | single layer | — | good | excellent | excellent | good |
| Example 4 | single layer | — | good | good | excellent | good |
| Example 5 | A/B/A | 1 | good | excellent | excellent | good |
| Example 6 | A/B/A | 1 | good | excellent | excellent | good |
| Example 7 | A/B/A | 3 | good | excellent | excellent | good |
| Example 8 | A/B/A | 0.6 | good | excellent | good | good |
| Example 9 | A/B/A | 1 | good | excellent | excellent | good |
| Example 10 | A/B/A | 1 | good | excellent | good | good |
| Example 11 | A/B | 0.5 | good | excellent | excellent | good |
| Example 12 | A/B | 0.5 | good | excellent | excellent | good |
| Example 13 | A/B | 1 | good | good | excellent | good |
| Example 14 | A/B | 1 | good | excellent | good | good |
| Com. Ex. 1 | single layer | — | good | good | not good | not good |
| Com. Ex. 2 | single layer | — | good | not good | not good | not good |
| Com. Ex. 3 | single layer | — | good | not good | not good | not good |
| Com. Ex. 4 | single layer | — | good | not good | not good | not good |
| Com. Ex. 5 | single layer | — | not good | not good | not good | good |
| Com. Ex. 6 | A/B/A | 1 | good | not good | not good | not good |
| Com. Ex. 7 | A/B/A | 1 | good | not good | not good | good |

Although several preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A process for producing a polyester film, comprising the steps of:

heat treating at least one surface of a non-stretched film whose major component is a polyester A having a crystallization parameter ΔTcg of not more than 70° C. and which optionally contains particles and accelerating the crystallization of said at least one surface by said heat treatment; and biaxially stretching said heat treated non-stretched film to form a biaxially stretched film so that protrusions are formed on the surface of said biaxially stretched film corresponding to said at least one surface of said non-stretched film in a number of not less than $5 \times 10^3$/mm$^2$, and so that the ratio $N_R$ of said number of protrusions to the number of any particles contained in said surface layer of said biaxially stretched film is not less than 5.

2. A process for producing a laminated polyester film, comprising the steps of:

laminating a layer A whose major component is a polyester A having a crystallization parameter ΔTcg of not more than 70° C. and optionally contains particles on at least one surface of a layer B whose major component is a polyester B to form a non-stretched laminated film;

heat treating the surface of said layer A of said non-stretched laminated film and accelerating the crystallization of a surface of said layer A by said heat treatment; and biaxially stretching the surface of said layer A of said non-stretched laminated film to produce a biaxially stretched film so that protrusions are formed on the surface of a surface layer of said biaxially stretched film corresponding to the surface of said layer A of said non-stretched laminated film in a number of not less than $5 \times 10^3$/mm$^2$, and so that the ratio $N_R$ of said number of protrusions to the number of any particles contained in said surface layer of said biaxially stretched film is not less than 5.

3. The process for producing a polyester film according to claim 1, wherein said heat treating is carried out at a temperature of 100° to 250° C. for 0.5 to 150 seconds.

4. The process for producing a polyester film according to claim 1, wherein said heat treating is carried out at a temperature of 140° to 250° C. for 1 to 50 seconds.

5. The process for producing a polyester film according to claim 1, wherein said heat treating is carried out at a temperature of 155° to 240° C. for 2 to 10 seconds.

6. The process for producing a polyester film according to claim 1, wherein said heat treating is carried out to produce spherulites of said polyester A having a mean diameter of 0.03 to 0.45 μm.

7. The process for producing a polyester film according to claim 1, wherein said heat treating is carried out to produce spherulites of said polyester A having a mean diameter of 0.10 to 0.30 μm.

8. The process for producing a polyester film according to claim 1, wherein said heat treating and biaxially stretching are carried out so that at least 70% of said protrusions originate from the crystallization of polyester A.

9. The process for producing a polyester film according to claim 1, wherein said heat treating and biaxially stretching are carried out so that at least 85% of said protrusions originate from the crystallization of polyester A.

10. The process for producing a polyester film according to claim 10, which is carried out so that the solution haze of the polyester film is less than 10%.

11. The process for producing a polyester film according to claim 2, wherein said heat treating is carried out at a temperature of 100° to 250° C. for 0.5 to 150 seconds.

12. The process for producing a polyester film according to claim 2, wherein said heat treating is carried out at a temperature of 140° to 250° C. for 1 to 50 seconds.

13. The process for producing a polyester film according to claim 2, wherein said heat treating is carried out at a temperature of 155° to 240° C. for 2 to 10 seconds.

14. The process for producing a polyester film according to claim 2, wherein said heat treating is carried out to produce spherulites of said polyester A having a mean diameter of 0.03 to 0.45 μm.

15. The process for producing a polyester film according to claim 2, wherein said heat treating is carried out to produce spherulites of said polyester A having a mean diameter of 0.10 to 0.30 μm.

16. The process for producing a polyester film according to claim 2, wherein said heat treating and biaxially stretching are carried out so that at least 70% of said protrusions originate from the crystallization of polyester A.

17. The process for producing a polyester film according to claim 2, wherein said heat treating and biaxially stretching are carried out so that at least 85% of said protrusions originate from the crystallization of polyester A.

18. The process for producing a polyester film according to claim 2, which is carried out so that the solution haze of the polyester film is less than 10%.

* * * * *